United States Patent Office 3,076,344
Patented Feb. 5, 1963

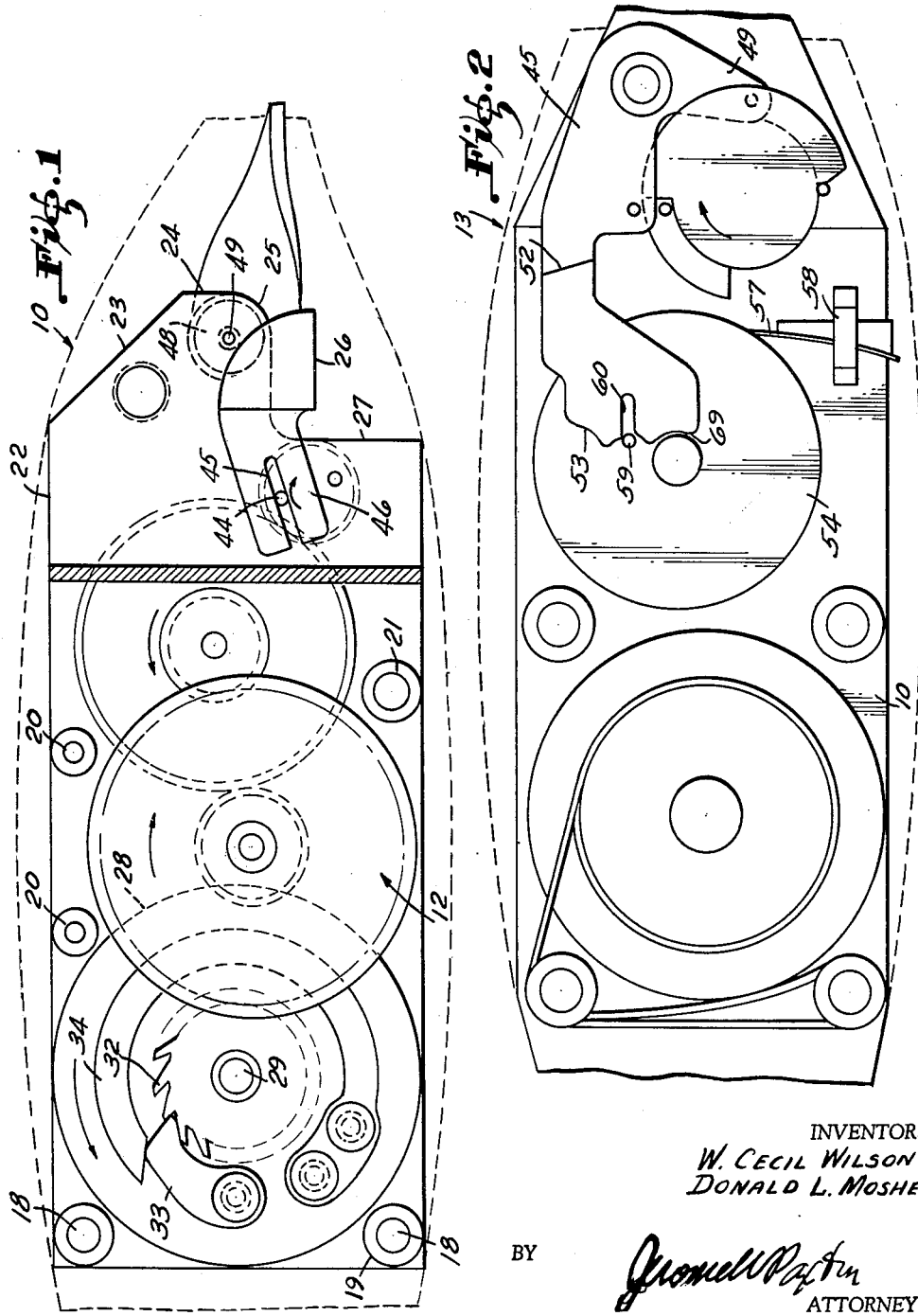

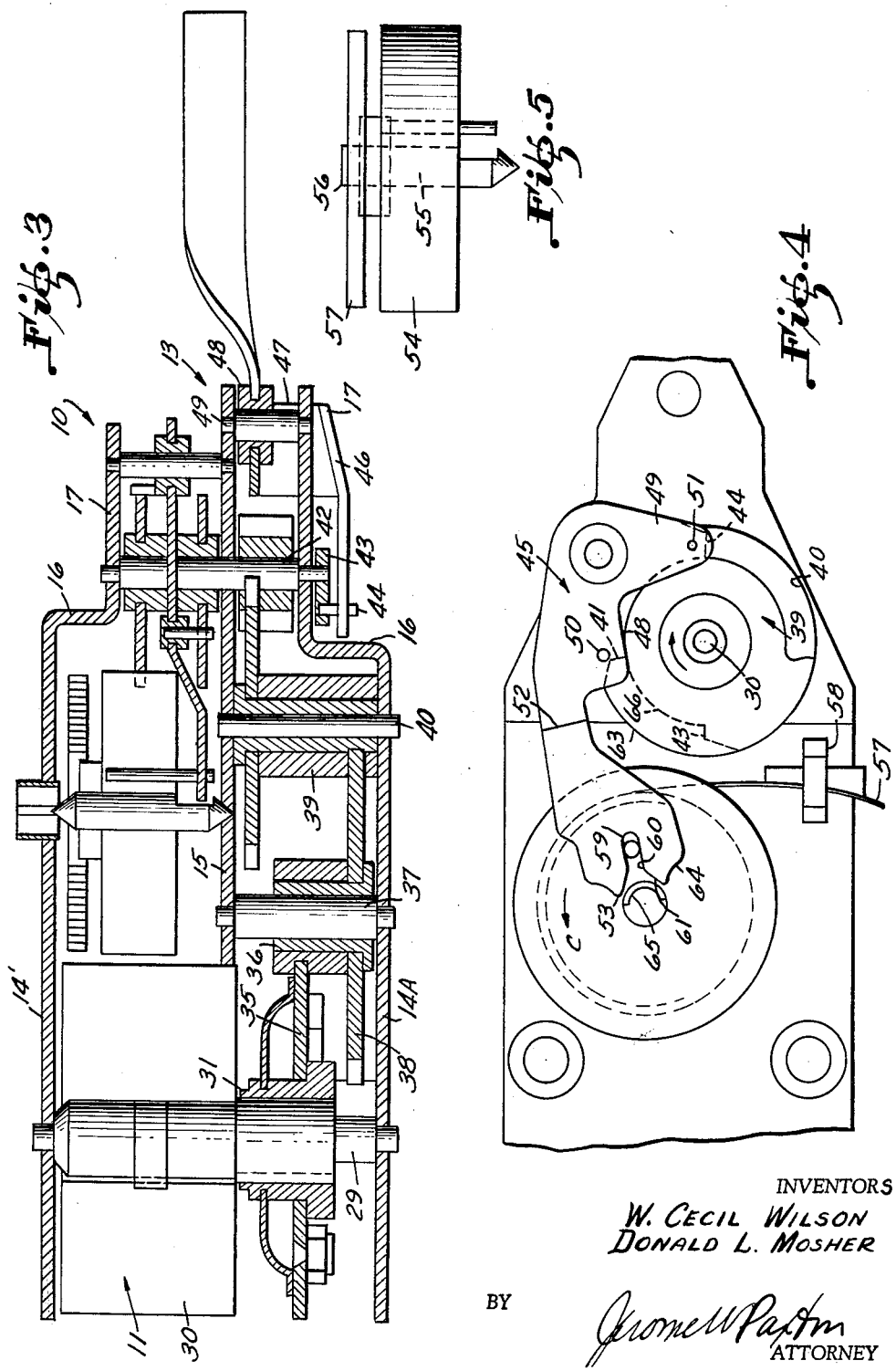

3,076,344
MECHANISM-ESCAPEMENT CONTROLLED
Willie Cecil Wilson, Senath, Mo., and Donald L. Mosher, Evanston, Ill.; said Mosher assignor, by mesne assignments, to said Wilson
Filed Mar. 14, 1955, Ser. No. 493,994
4 Claims. (Cl. 74—1.5)

The present invention relates to an assembly for imparting movement to a movable part, and, more particularly has reference to an assembly wherein a power source for imparting movement to the movable part is operatively connected to the movable part by means of a gear train and an escapement unit integral with the gear train permits a predetermined action to the movable part at a given time to allow the movable part to operate for longer time periods.

While in the present application the invention is shown and described in connection with an artificial bait or lure, it is to be understood that the assembly is of broader application and can be used for toys having at least one movable part as well as other devices.

In connection with lures, one of the main problems encountered in motor driven lures has been to provide means to control the power used to impart the required movement to the movable member so as to conserve the power to permit the lure to operate over extended or substantial time periods. In the past, efforts have been made to solve the problem, and, various types of governors have been incorporated in the gear train for this purpose. Such devices have not proven entirely satisfactory.

We have solved the problem successfully by employing an escapement unit to control and time the action of the gear train and the movable part of the lure, which, in the present application is the simulation of a fish tail swingable about a vertical axis. Manifestly, a person skilled in the art, after a reading of the application can adapt the principles thereof to other mechanical environments without the necessity of experimentation.

A study of the following detailed description will indicate the various objects and advantages attained by the invention, and the invention consists in the details of construction and in the arrangement and combination of parts to be hereinafter more fully set forth and claimed.

In describing the invention in detail, reference will be had to the accompanying drawings forming part of this application, wherein like characters denote corresponding parts in the several views and in which:

FIGURE 1 is a top plan view, partly in cross-section of an artificial lure embodying the invention.

FIGURE 2 is a top view of the lure showing the escapement unit.

FIGURE 3 is a vertical sectional view of the lure depicted in FIGURE 1.

FIGURE 4 is a detailed view of the balance wheel, the control lever and the escapement cams on the output shaft, and FIGURE 5 is a plan view of the control lever.

As shown in FIG. 3, 10 indicates a supporting frame, 11 a spring motor, 12 a gear train, 13 an escapement unit and 14 a movable part.

The frame 10 comprises outer plates 15 and 16 and an inner or intermediate plate 17 of lesser length than the outer plates. These plates may be made of any suitable material and are held in the proper spaced relationship by strategically located bolts and the like.

A cross shaft 18 is journalled in the plates 15 and 16 at approximately the longitudinal center line of the plates and the spring motor 11 is carried by such shaft. Also keyed at 19' on the shaft 18 is a hub element 19 having ratchet teeth 20 which cooperate with a pivoted pawl 21 which is urged into contact with such teeth by spring 22.

The pawl and ratchet teeth serve to permit winding of the spring of the motor 11.

The hub element is also provided with a gear 23 which meshes with a further gear 24 secured at 24' to cross shaft 25 journalled in the frame. A gear wheel 26 is also carried by the cross shaft 25 and meshes with gear 27 secured at 27' to cross shaft 28 and a gear wheel 29 is mounted on the shaft 28 as shown in FIGS. 1 and 3.

It will be seen that the shaft 18 and the hub element 19 can rotate in a clockwise direction to permit the winding of the spring of the motor whereas the gear 23 in mesh with the gear 24 on the shaft 25 remains stationary, slipping in a bearing of the hub. The counter-clockwise torque loading from the motor spring urges the hub element in a counter-clockwise direction and the teeth 20 of the hub element engaging the pawl 21 loads the gear 23 with a counter-clockwise torque.

An output shaft 30 is supported by the frame rearwardly of the shaft 28 and the lower end of the shaft 30 supports a disc-like member 31. A pin 32 eccentrically mounted on the disc-like member extends outwardly therefrom and fits in an elongated slot 33 formed in a control arm 34, the slot being open at its outer end as illustrated in FIG. 1. The control arm 34 is attached to a hub 35 carried by a pin 36 rotatable in the frame 10 about a vertical axis and the control arm is provided with a rearwardly extending portion 37 which functions as the movable part or a tail fin and attention is called to FIG. 3.

A gear 38 secured at 38' to the shaft 30 meshes with the gear wheel 29 (FIG. 3) on the shaft 28. In addition, a pair of cams 39 and 40 are supported by the shaft 30 and the perimeter of the cam 39 is formed with a pair of substantially flat shoulders 41 and 42 located approximately 180 degrees apart. The cam 40 likewise is provided with a pair of flat shoulders 43 and 44 with such shoulders being displaced approximately 90 degrees as regards the shoulders 41 and 42 as best shown in FIG. 4.

An escapement lever 45 (FIGS. 2 and 4) includes a shaft 46 journalled in the frame 10 and a hub portion 47 thereon. The body portion of the lever is formed with a pair of angular arms 48 and 49 and each arm carries an outwardly projecting pin 50 and 51, respectively. The body of the lever is displaced laterally intermediate the length thereof as at 52 and terminates in a forward arm portion 53.

A balance wheel 54 is carried by a shaft 55 journalled in the frame 10 and collar 56 of hair spring 57 is fixed to the shaft 55. The opposite end of the hair spring is anchored to the frame in a detachable manner as shown at 58. A pin 59 projects outwardly from the balance wheel and it can be seen that the pin is eccentrically located.

To describe more accurately the functions of the escapement assembly, the balance wheel vibrates angularly at its natural frequency which controls and times the angular action of the shaft 30 through the action of the cams 39 and 40 with the escapement lever 45, and through the action of the lever 45 and the pin 59 located on the balance wheel 54. It can be seen that the forward arm portion of the lever 45 is slotted at 60 and that the outer end of the slot is formed with an enlarged throat 61 with the balance wheel pin 59 acting with the slot 60. The coaction between the pin 59 and the throated surface 61 and slot 60 of the lever causes the lever to oscillate an approximate equal angular displacement to either side of its mid-position relative to the center line of the balance wheel 54 as the wheel oscillates a substantially equal angular displacement to either side of its mid-position with respect to the center line of the lever.

When the balance wheel is displaced in the direction of the arrow A past its mid-position as shown in FIG. 4, and, the lever 45 is displaced beyond its mid-position in the direction shown by the arrow B to its extreme displacement, the pin 50 of the lever is latched against the shoulder 41 of the cam 39 and the arcuate surface thereof so that the shaft is restricted against rotation in the normal operating direction. When the balance wheel returns to its mid-position and displaces further in the direction of the arrow C, the lever 45 rotates past its mid-position in the direction of the arrow D to the extreme displacement in such direction. Thus, the pin 50 is released from the shoulder and arcuate surface of the cam 39 allowing rotation of the shaft in a clockwise direction. Pin 51 then is oriented in a positon to latch on the shoulder 43 of the cam 40 and the arcuate surface thereof when the shaft has turned 180 degrees.

The pin 51 is released in a similar fashion to the pin 50 and the pin 50 is re-latched with the shoulder 41 and the arcuate surface of the cam. The successive repetitions of such steps permits successive releases of the shaft for rotation in increments of 180 degrees at twice the frequency of the balance wheel.

It will be appreciated that when the respective pins 50 and 51 are released from their latched positions, energy is furnished for such actions and must be replaced. This is achieved in the following manner:

When pin 50 is unlatched, and reference is made to FIG. 4, rotation of the shaft results and surface 62 of the cam engages the pin 50 thus accelerating the lever 45 in the direction D which in turn energizes the balance wheel through the action between the balance wheel pin 59, the throat 61 and the slot 60. When the balance wheel is displacing in the direction C, the pin 50 is riding on the surface 63 of the cam and holds the lever 45 out in this position, during the time the output shaft indexes to its next position. This will prevent surface 64 at the front end of the lever from "rubbing" against the balance wheel shaft thereby discouraging the stalling of the balance wheel and isolating vibrations from the wheel which could cause damping at the wheel if transmitted through the lever 45.

As the lever 45 is moved to the extreme position shown by arrow D, and, the pin latched on shoulder 43 and the arcuate surface of the cam, with the balance wheel displaced in the direction C, the relationship between the balance wheel shaft and the surface 64 of the lever 45 will prevent the accidental unlatching of the pin 51 from the shoulder and the arcuate surface of such cam. The displacement of the balance wheel 54 in the direction of the arrow C will only permit the passage of the lever 45 past the wheel shaft when slot 65 of such shaft orients in time with the coaction of the balance wheel pin 59 with the throat 61 and the lever slot 60. The pin 51 is then allowed to unlatch in a proper fashion from the shoulder 43 and the arcuate surface of the cam.

When the power spring is wound, the torque loading on the output shaft is opposite to that shown in FIGURE 4, and the output shaft will be caused to rotate in a direction opposite to the showing of the figure. This is due to the friction existing at the power spring shaft in the pawl and teeth clutch unit. During the winding process, if the lever 45 is oriented in the direction of the arrow D, the pin 51 will be oriented to engage shoulder 44 and the adjacent arcuate surface of the cam thereby securing the output shaft and preventing the rotation of the gear train. This is likewise true when the lever 45 is moved in the direction B in which event, the pin 50 would engage the shoulder 42 and the adjacent arcuate surface of the cam.

Hence, from this description, it is manifest that the arrangement permits successive releases of the output shaft for rotation in increments of either 90 degrees or 180 degrees at twice the frequency of the balance wheel escapement unit.

In the specific form illustrated, the frame may be covered with a suitable material such as rubber to simulate the desired bait, and the movement imparted to the body of the bait through the oscillation of the rearwardly extending portion 37 is quite realistic.

The invention is not to be construed with any strict conformity with the showings in the drawings but may be changed or modified so long as such changes or modifications mark no material departure from the salient features of the invention as expressed in the appended claims.

We claim:

1. An escapement mechanism including a frame, an output shaft, a balance wheel connected to the frame, an escapement lever pivoted to the frame and operatively coupled with the balance wheel, cam means on the output shaft having latching surfaces thereon, pin means on the escapement lever cooperating with such latching surfaces to prevent rotation of the said output shaft when the balance wheel is displaced in one direction and when such wheel is displaced in another direction, the escapement lever moves about its pivot to move the pin means from the latching surfaces to permit rotation of the shaft and further cam means with latching surfaces thereon carried by the output shaft engageable by the pin means to prevent rotation of the output shaft after such shaft has rotated a predetermined number of degrees.

2. The mechanism defined and claimed in claim 1 wherein the latching surfaces on the cam means are constituted by a flat shoulder and an adjacent arcuate edge.

3. The mechanism defined and claimed in claim 1 including means to replace the energy supplied by the balance wheel during the movement of the escapement lever about its pivot to operate the pin means thereon.

4. The mechanism defined and claimed in claim 1 wherein the geometric relationship between the latching surfaces on the cam means permits a predetermined rotation of the output shaft when such surfaces are unlatched.

References Cited in the file of this patent

UNITED STATES PATENTS

| | | |
|---|---|---|
| 332,879 | Chapman | Dec. 22, 1885 |
| 369,568 | Street | Sept. 6, 1887 |
| 374,146 | Essex | Nov. 29, 1887 |
| 696,944 | Cooper | Apr. 8, 1902 |
| 726,021 | Bryan | Apr. 21, 1903 |
| 1,867,947 | Kobler | July 19, 1932 |
| 2,003,193 | Hirose | May 28, 1935 |
| 2,385,011 | Lurtz | Sept. 18, 1945 |
| 2,648,935 | Nagel | Aug. 18, 1953 |